United States Patent [19]

Meo et al.

[11] Patent Number: 4,627,749
[45] Date of Patent: Dec. 9, 1986

[54] CHARACTER GENERATOR SYSTEM FOR DOT MATRIX PRINTERS

[75] Inventors: Joseph Meo; Michael P. Taylor, both of Norwalk, Conn.

[73] Assignee: Pitney Bowes Inc., Stamford, Conn.

[21] Appl. No.: 581,631

[22] Filed: Feb. 21, 1984

[51] Int. Cl.⁴ .......................... B41J 3/02; G06F 3/12
[52] U.S. Cl. .................................... 400/121; 364/200
[58] Field of Search ............... 364/200, 900, 523, 524, 364/418; 340/730, 731, 732, 748, 749, 750, 724, 728, 715, 716; 101/128, 93; 400/121; 371/25, 16, 37; 346/75, 25; 365/200; 354/4

[56] References Cited

U.S. PATENT DOCUMENTS

| | | | |
|---|---|---|---|
| 3,174,427 | 3/1965 | Taylor | 101/93 |
| 3,911,420 | 10/1975 | Lampson | 340/324 |
| 4,024,506 | 5/1977 | Spaargaren | 340/172.5 |
| 4,115,765 | 9/1978 | Hartke | 340/324 |
| 4,163,285 | 7/1979 | Bahr | 364/710 |
| 4,243,987 | 1/1981 | Bobick | 340/799 |
| 4,283,724 | 8/1981 | Edwards | 340/731 |
| 4,441,105 | 4/1984 | Van Vliet et al. | 340/750 |
| 4,555,763 | 11/1985 | Dahme | 364/521 |
| 4,559,615 | 12/1985 | Goo et al. | 364/900 |

Primary Examiner—Gareth D. Shaw
Assistant Examiner—Randy W. Lacasse
Attorney, Agent, or Firm—Peter Vrahotes; Melvin J. Scolnick; Albert W. Scribner

[57] ABSTRACT

A character generator system for dot matrix printers wherein a microprocessor receives an input signal in the form of an M bit digital code, such as ASCII code, and representing a text to be reproduced in dot matrix form as well as other bits of information. The microprocessor converts the incoming code from an M bit code to an N bit code, where N is greater than M, whereby substantially more information may be transmitted. The microprocessor then sends appropriate information to various components of the system that cooperate to control a dot matrix printer in accordance with the input coded information.

8 Claims, 10 Drawing Figures

CHARACTER GENERATOR SYSTEM FOR DOT MATRIX PRINTERS

BACKGROUND OF THE INVENTION

In the field of dot matrix printers, a large number of different types of devices have been developed. These include non-impact printers such as laser printers, thermal printers, ink jet printers and the like. Dot matrix printers of the impact type also are well known, such printers usually being equipped with pins that are actuated to create dots on a record member.

In dot matrix printers, a character generator system is generally provided that receives a code, such as an ASCII code, that dictates the text to be printed. Although printing one character of the text at a time would present no difficulty, it becomes apparent that printing a page made up of a number of characters in the form of dots presents particular problems. Dot matrix printers will usually print one line of dots at a time, each line representing a portion of a large number of characters. As a consequence, the location of the various characters to be printed upon the record member must be taken into account. Furthermore, substantial information is sometimes required in addition to the character to be printed. For example, not only the character to be printed is required, but the type of font to be used, line length, line pitch and the like should be taken into account. It also may be desirable to print a pattern or design as background for the text. In addition, it is sometimes desirable to produce a character made of dots of different sizes so as to obtain characters with edges having a smoother appearance. All these requirements and options require more information than the incoming signal can provide.

SUMMARY OF THE INVENTION

A character generator system is provided for receiving an M bit input code representative of text to be printed and converting this to an N bit code, where N is greater than M, so that expanded information may be supplied for the character generator system. The N bit code represents information that is resident in the character generator system and the M bit code serves as a pointer to obtain the resident information. The expanded information allows a dot matrix printer to print a text containing characters selected from a variety of different fonts and in different format. This is accomplished by storing information relative to the type of fonts, dot sizes to be used, and the like and controlling the manner in which the information is supplied to the printer. Similarly, line pitch, character height and width, and the like may also be achieved through the expanded code.

DETAILED DESCRIPTION OF THE INVENTION

Figure 1:
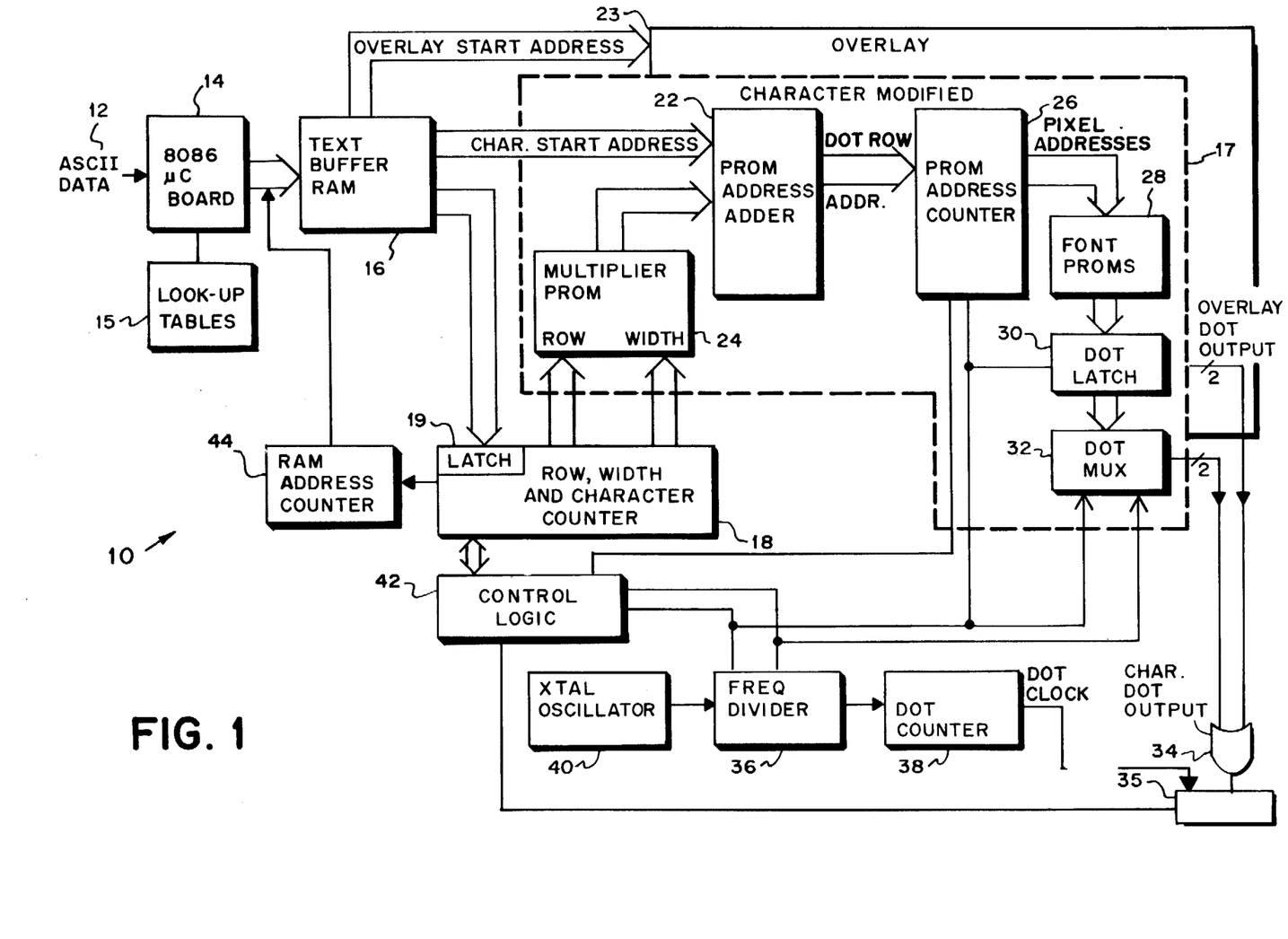
FIG. 1 shows a block diagram of a character generator system through which the instant invention may be practiced.

Referring now to FIG. 1 of the drawing, a character generator system for supplying information to a dot matrix printer is shown generally at 10 and includes an input 12 from which data in the form of a code, such as American Standard Code for Information Interchange (ASCII), may be received. The ASCII code represents data to be printed or control information describing how the data is to be reproduced, such as font selection, line pitch, end of line indicator and the like. The input 12 is supplied to a microprocessor 14, such as an Intel Model 8086 microprocessor, available from Intel Corp., Santa Clara, CA, which contains memory that may be used as look-up tables, shown separately at 15 for convenience. The output from the microprocessor 14 is directed to a text buffer RAM 16 whose outputs go to a row, width and character (RWC) counter 18, which has a plurality of latches shown collectively at 19, to a PROM address adder 22 and to an overlay 23. The overlay 23 substantially duplicates the structure of that portion of the character generator shown at 17 and will therefore not be described.

The output from the PROM address adder 22 goes to a PROM address counter 26 which in turn outputs to a plurality of font PROMs 28. The font PROMs 28 output to dot latches 30, which in turn are connected to a dot multiplexer 32. The multiplexer 32 outputs to an OR gate 34, the other terminal of the OR gate being connected to the output of the overlay 23. The output of the OR gate 34 is connected to the print head circuitry of a dot matrix printer 35 such as the print head circuitry of an LED printer of the type shown and described in co-pending U.S. Pat. No. 4,427,275-1/24/84 entitled "Xerographic Electronic Printer", filed July 22, 1982 and assigned to the assignee of the instant invention; FIG. 4 and page 6, line 20 through page 7, line 4 of said co-pending U.S. patent application being incorporated by reference.

A frequency divider 36 is connected to the dot multiplexer 32. A dot counter 38 and a crystal oscillator 40 are connected to the frequency divider 36 as is a control logic unit 42. The dot counter 38 also is connected to the printer 35 and a control logic unit 42, the latter also being in communication with the dot multiplexer 32 and the RWC counter 18. The control logic 42 may be a microprocessor, such as an Intel Model 8085, which has been programmed to synchronize the various units as is known in the art. A RAM address counter (RAC) 44 is in connection with the RWC counter 18 and with the text buffer RAM 16.

Figure 2:
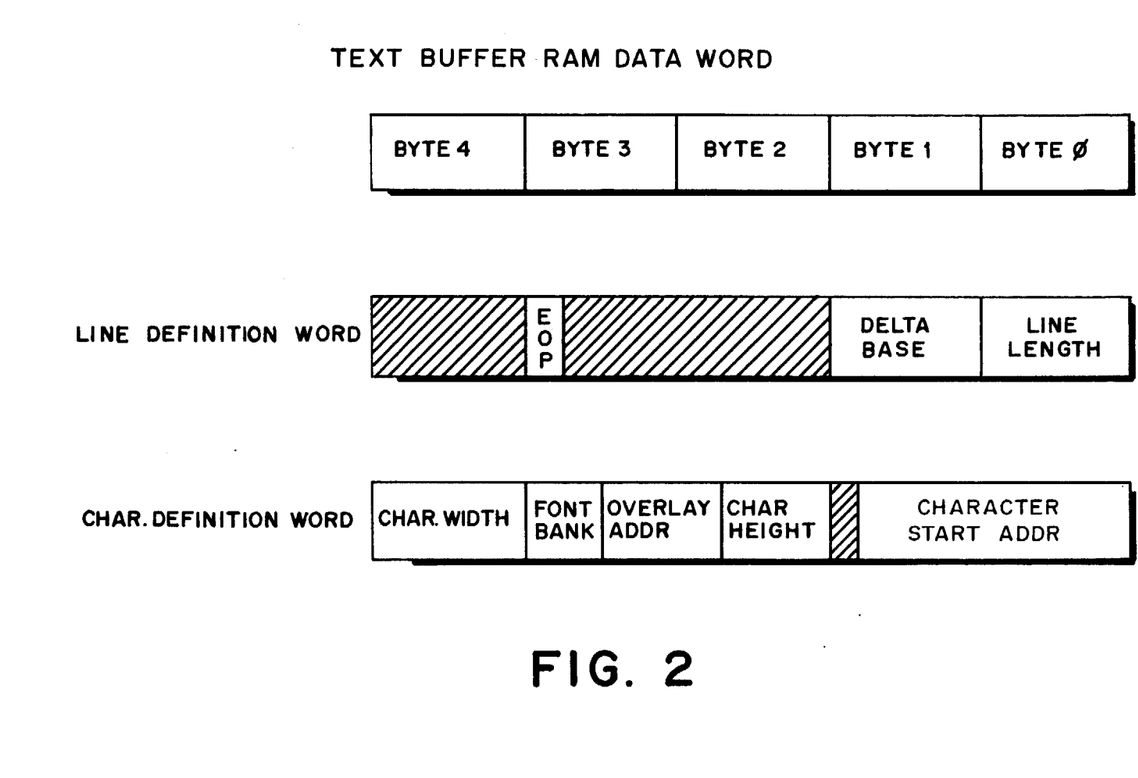
FIG. 2 is a field allocation schematic diagram of an expanded data code that may be used in the instant invention.

In operation, the ASCII code is received at the input 12 in the form of an M bit code such as an eight bit code. This M bit code is extended to an N bit code, where N is greater than M, as for example, from an eight bit code to a forty bit code, by the microprocessor 14 to provide data so that the downstream hardware may function more efficiently to obtain different types of fonts and other print characteristics such as character height, line pitch, line length and the like. The incoming eight bit ASCII code 12 serves as an indexer or pointer for information resident in the look-up tables 15 of the microprocessor 14. With reference to FIG. 2, these look-up tables contain forty bit character definition words that are placed into the text buffer RAM 16 along with line definition words calculated by the microprocessor 14. The look-up table 15 is arranged as X number of fonts with Y number of characters per font with each character having five bytes, i.e., 40 bits per character definition word. In the example of this preferred embodiment, X equals 9 and Y equals 128. The line definition words define the delta base (number of lines per unit length or line pitch), line length, the number of characters per line and the end of page. The character definition words define the characteristics of the characters to be printed and the character start addresses.

Referring again to FIG. 1, each forty bit word is placed in the text buffer RAM 16 in sequence until the text to be printed is received by the text buffer RAM. When the microprocessor 14 is finished loading the text buffer RAM 16, it flags the control logic unit 42 so that the RAM address counter 44 takes control of the text buffer RAM address bus. The line definition words define the number of characters to be printed on a line and the RAC 44 will increment the address for each character in the character line word. The RAM address counter 44 will generate sequentially addresses that point to a forty bit character definition word in the text buffer RAM 16. Contents of this word will be loaded into the RWC counter 18 whose operation will be described in detail hereinafter. Referring to FIG. 2, part of the forty bit character definition word is overlay 23 information which provides features such as underscoring and shading. Another part of the character definition word consists of character start addresses which the text buffer RAM loads into the PROM address adder 22 and the remainder is character width and character height information which is loaded into the RWC counter 18 as previously indicated.

The PROM address adder 22 also receives address offset information from the multiplier PROM 24 whereby the location of a called for character may be determined for the PROM address counter 26. The PROM address adder 22 takes the output from the multiplier PROM 24 and adds it to the character starting address from the text buffer RAM 16 to get the address for the dot row that is to be printed. This dot row address is then sent to the PROM address counter 26 which has an output that represents the pixel addresses of the dot row being printed. Each pixel address points to an eight bit block of memory in the font PROMs 28 that represent four contiguous pixels. The information from the PROM address counter 26 received by the font PROMs 28 only represents dot location. The font PROMs 28 contain information relative to the dot size for the particular pixels to be printed based upon the addresses received from the PROM address counter 26. A sequential stream of information is outputted by the font PROMs 28, latched by the dot latch 30 and serialized by the dot multiplexer 32. This output from the dot multiplexer is received in series by the OR gate 34 as well as the output from the overlay 23 from which the dot signals that make up the text are transmitted to the integrated circuit of the LED printer 35.

Basically, the character generator 10 is a controllable countdown chain, where the control parameters are pieces of information that are coming out of the text buffer RAM 16. This information defines the height and width of the characters, the distance between lines and the number of characters in the lines. It controls not only the addressing of the font PROMs 28, but also the addressing of the text buffer RAM 16. The output of the PROM address counter 26 is the correct address of the dot row which is to be addressed in the font PROMs 28. In this manner, the addressing of the font PROMs 28 is controlled and dot data output is obtained from the font PROMs. The dot data is then serialized in the multiplexer 32 which takes eight bits of parallel dot data and serially outputs that dot data which fill serial dot buffers in the light emitting diode printer 35. The printer 35 controls the printing of such dots onto a record member.

Synchronizing the operation of the dot latch 30, the dot multiplexer 32 and the RWC counter 18 is the frequency divider 36—oscillator 40 combination which gives a clock rate, for example, of 22 megahertz (MHz) that is divided down to give an output dot rate of 5.5 mega bits per second. This is the rate at which the dot buffers in the LED printer 35 are filled and the dot counter 38 controls the dot latch output of the LED printer so that, for example, 2048 dots per line are outputted. This dot data output may be a two bit parallel output which allows the use of up to 4 dot sizes: no dot, small dot, medium dot and large dot. The dot counter 38 counts the requisite number of dots and interfaces between the character generator 17 and the LED printer 35. The PROM address counter 26 is loaded with the dot row addresses through control of the control logic 42 and the output of the frequency divider causes the PROM address counter to be incremented. Simultaneously, the RWC counter 18 is also incremented and when the previously loaded width of the character has been equaled, it sends a signal to the control logic 42 which indicates the end of character and causes the control logic to load the dot row address corresponding to the next character. The control logic 42 also communicates with the printer 35 to receive signals therefrom for purposes of synchronization.

Figure 3:
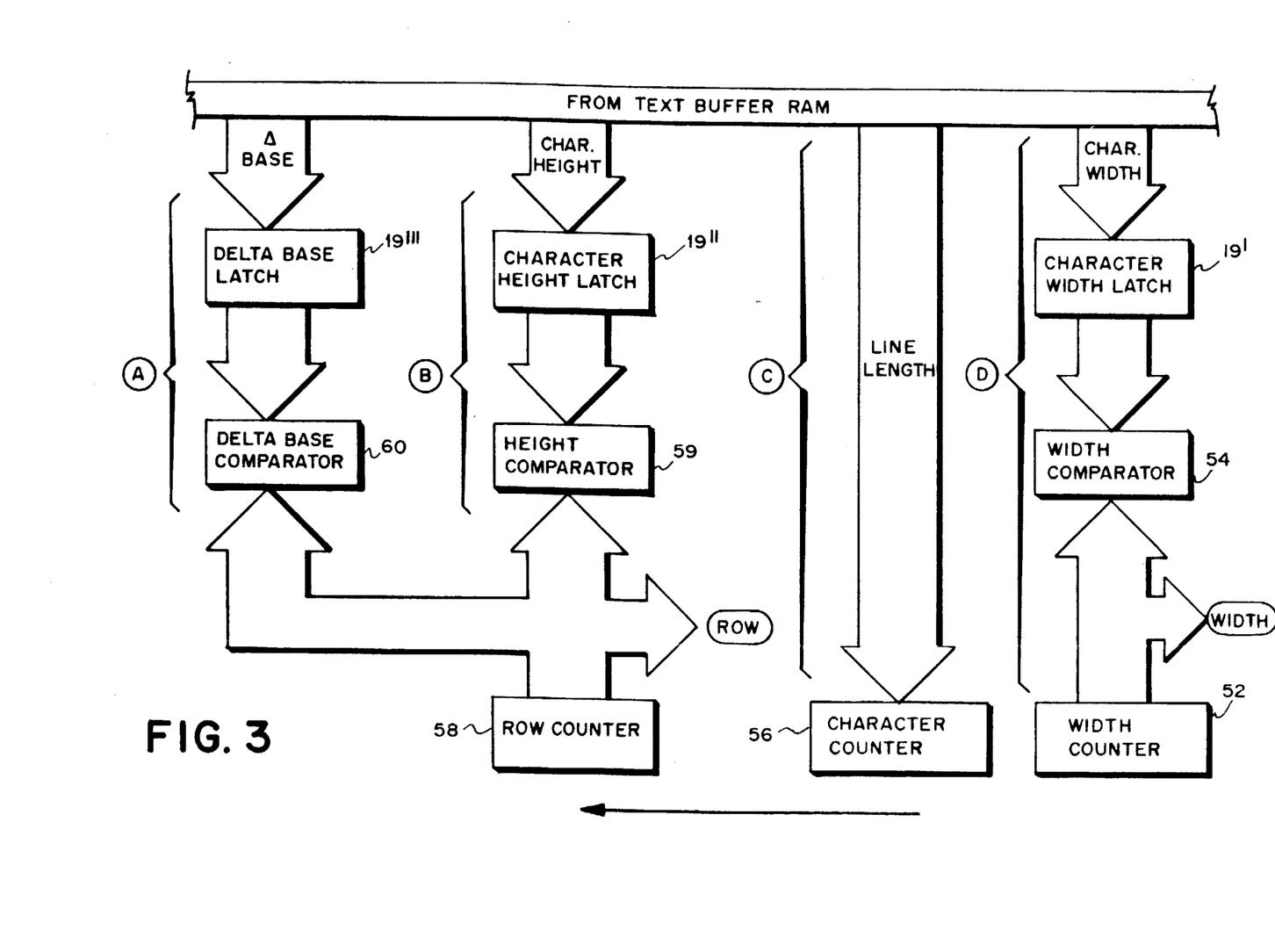
FIG. 3 is a detailed description of the row, width and character counter shown in FIG. 1.

Referring now to FIG. 3, the operation of the RWC counter 18 will be described in greater detail. "A" represents that portion of the RWC counter that is concerned with line pitch, "B" with character height, "C" with line length and "D" with character width. The character width information received at "D" from the text buffer RAM 16 is latched and compared to the current width count. When the width count equals the character width, a signal is issued to the control logic 42 which signifies that the current dot row character being printed has been finished.

The next character is then processed by the RAM address counter 44 and the character counter 56. The ones compliment of the character count is then loaded at "C" into the character counter 56. When the character counter 56 reaches its maximum, a signal is issued to the control logic 42 which blanks out the subsequent dots in the balance of the line. Character height information received at "B" from the text buffer RAM 16 is latched at 19″ and compared by the height comparator 59 to the current row count. When the row count equals the character height, a signal is issued to the control logic 42 which blanks out the remaining dot rows until the current row count equals the delta base. The delta base information is latched at 19‴ and compared by the comparator 60 to the current row count contained in row counter 58. When the row count equals the delta base, a signal is issued to the control logic 42 signifying that the vertical space between text lines has been counted and the next text line can be processed. This row width information is also supplied to the multiplier PROM 24 as is the width information. The character counter information is supplied to the control logic 42 which signals for loading and incrementing the counter 18 and receives signals indicating the various operations have been completed.

Figure 4A:
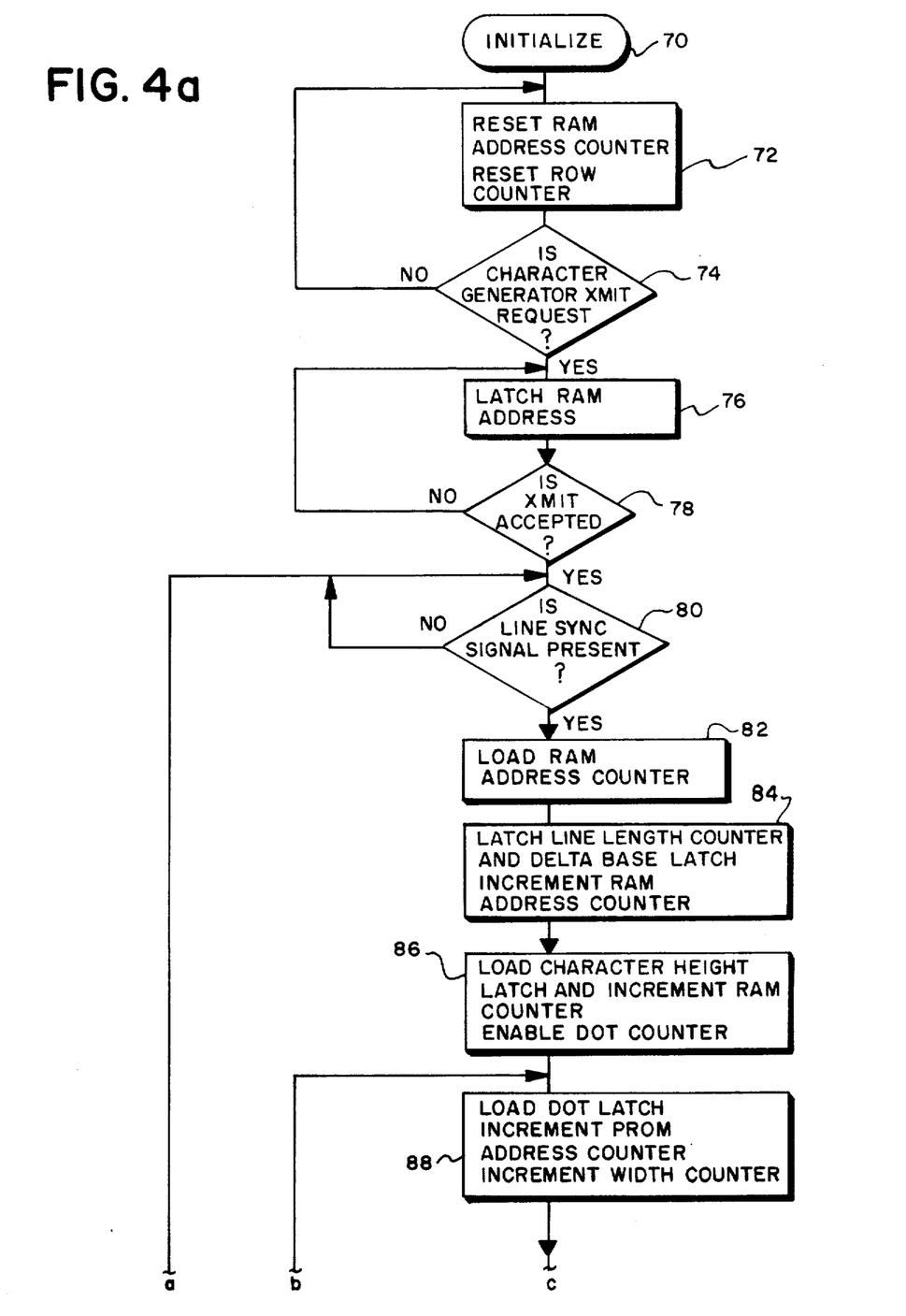
FIGS. 4a and 4b constitute a flow chart of the routine for the electronic circuitry of the system shown in FIG. 1.
Figure 4B:
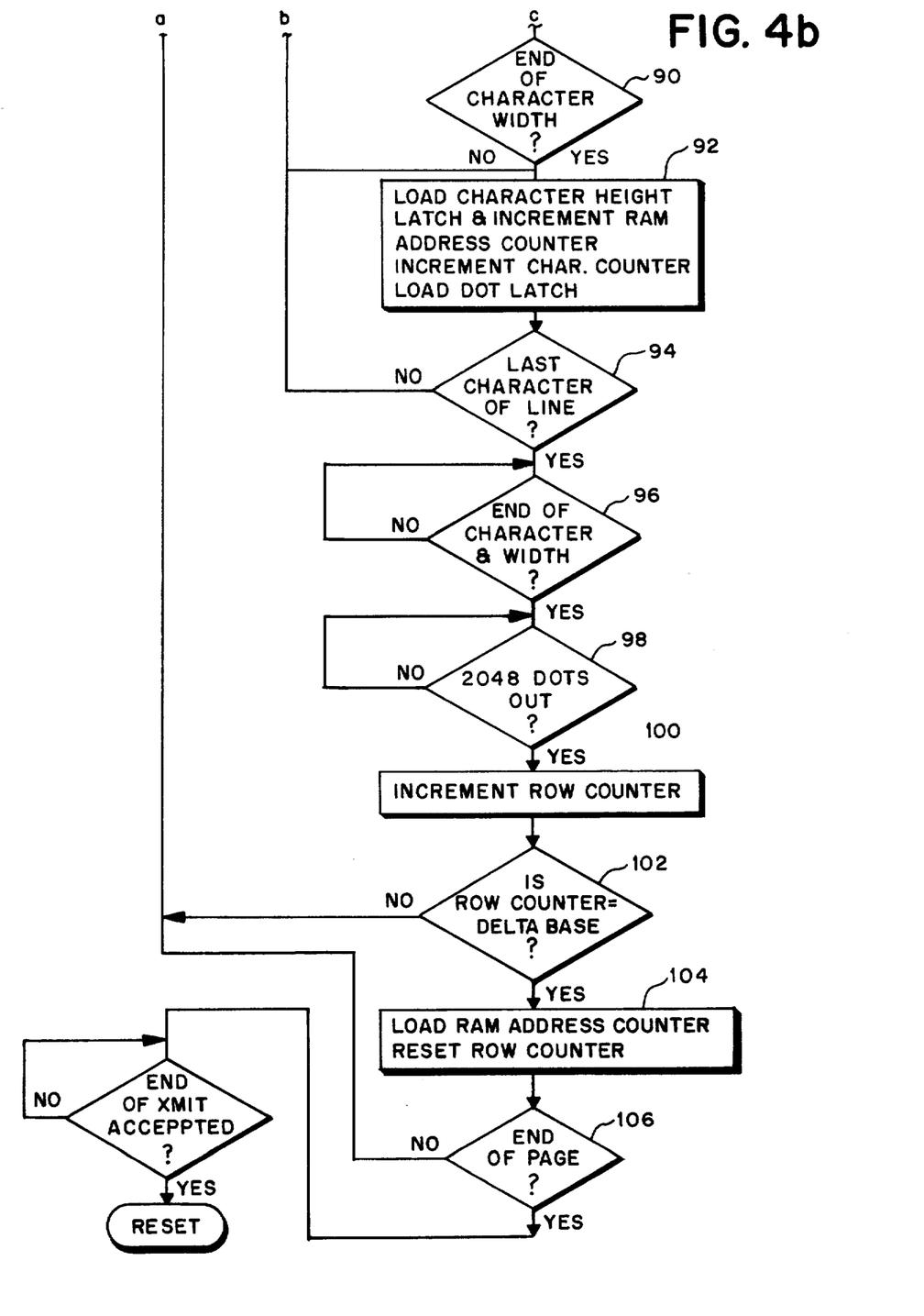

Referring now to FIGS. 4a and 4b, a description of the functioning of the character generating system 10 will be given. The system 10 is first initialized 70 after which the RAM address counter 44 and row counter 58 are reset 72. An inquiry is made as to whether the character generator 10 is transmitting a request 74. If no such request is made, a return is made to initialization 70 but if such a request is being transmitted, the RAM address counter 44 is latched 76. An inquiry is made as to whether this transmission is accepted and if not a return is made, but if such transmission is accepted, the question is asked if a line synchronization signal is present 80. If a line synchronization signal is not present, then a return is made and the question is repeated until such time as a line synchronization signal appears. When such line synchronization signal appears, the RAM address counter 44 is loaded thereby pointing to the next line definition word 82. Following this, line definition information is supplied and the line length counter 56 and delta base comparator 60 are latched and the RAM address counter 44 is incremented 84. This results in pointing to the next character definition word. The character height latch 19″ is loaded, the RAM address counter 44 is incremented and the dot counter 38 is enabled 86. Subsequent to this, the dot latch 30 is loaded, the PROM address counter 26 is incremented and the width counter 52 is also incremented 88. In this way information addressed by the font PROMS 28 is latched into the dot latch 30 and the incrementing of the PROM address counter 26 yeilds information for the next group of pixels. After this an inquiry is made whether the end of a character width has been achieved 90 by looking at the width comparator 54 to see if the character is finished. If not, the routine is returned as indicated but if the end of the character width is achieved, then the character height latch 19″ and character width latch 19′ are loaded, the RAM address counter 44 is incremented, the character counter 56 is incremented, and the dot latch 30 is loaded 92. After these routines have been completed, an inquiry is made whether the last character of a line has been achieved 94 by looking at the character counter 56. If not, the routine is returned as indicated, but if the last character of a line has been received, then an inquiry is made if the end of a character width has been accomplished 96. If not, then the routine is repeated until such an end is achieved i.e., it keeps looking until the alloted space is filled out. If the response is positive, then an inquiry is made if 2,048 dots have been transmitted 98. If not, then the inquiry is repeated until 2,048 dots have been transmitted 98. If not, the routine is repeated as indicated but if the question is answered affirmatively, the vertical row count 58 is incremented 100. Following this, an inquiry is made whether the count in the row counter 58 is equal to the delta base 102. If not the routine is returned, but if the response is affirmative, this means the vertical height is finished and the RAM address counter 44 is loaded and the row counter 58 is reset 104. Following this, an inquiry is made whether the end of a page has been achieved 106. If not, there is a return but if it has been achieved, then an inquiry is made if the end of transmitting has been accepted 108. If not, the inquiry is repeated until such time as a positive response is achieved and when a positive response is achieved, the character generator 10 is reset 110.

Figure 5A:
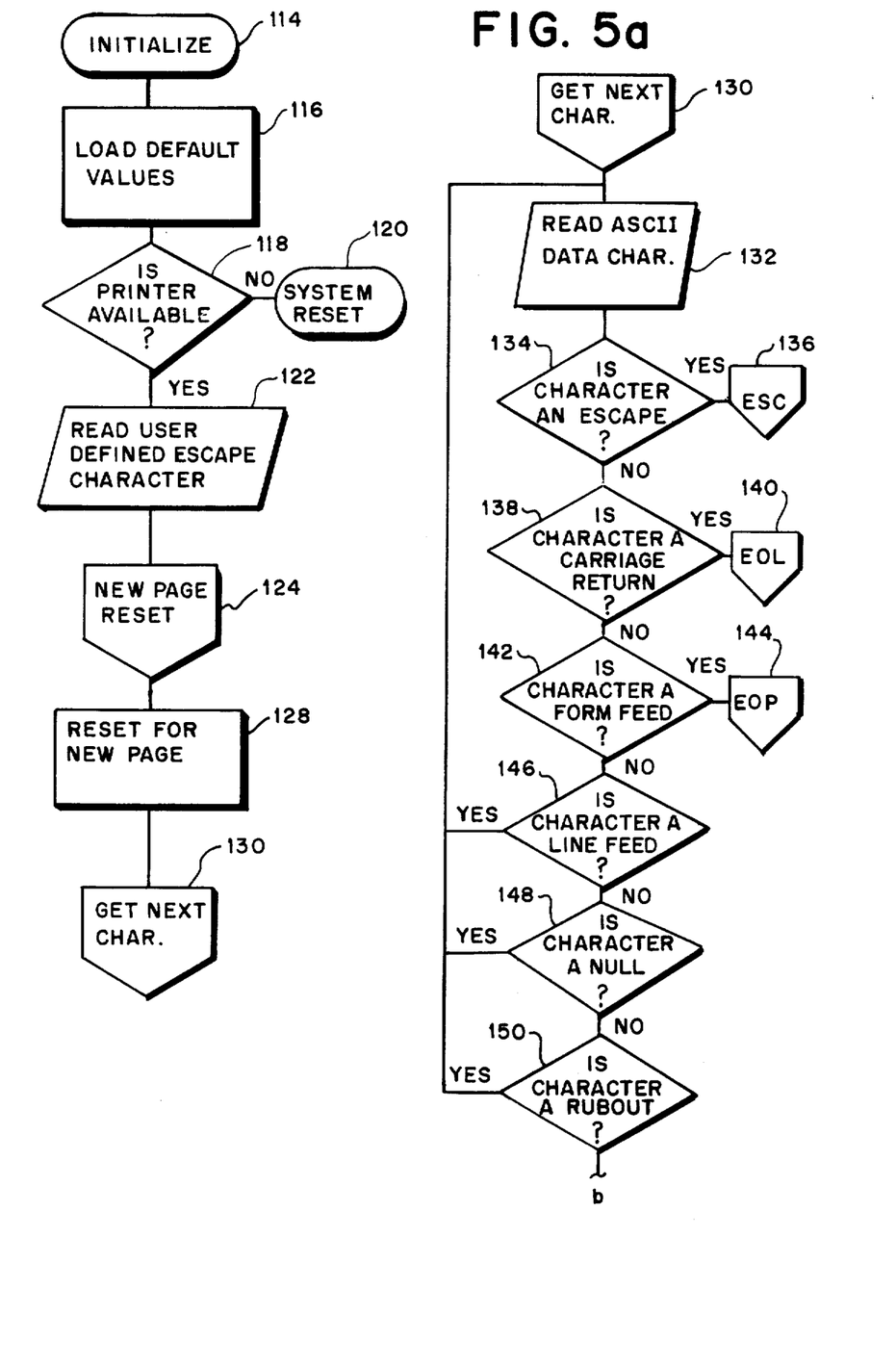
FIGS. 5a, 5b, 6, 7 and 8 constitute a flow chart of the routine for the control of the system shown in FIG. 1.
Figure 5B:
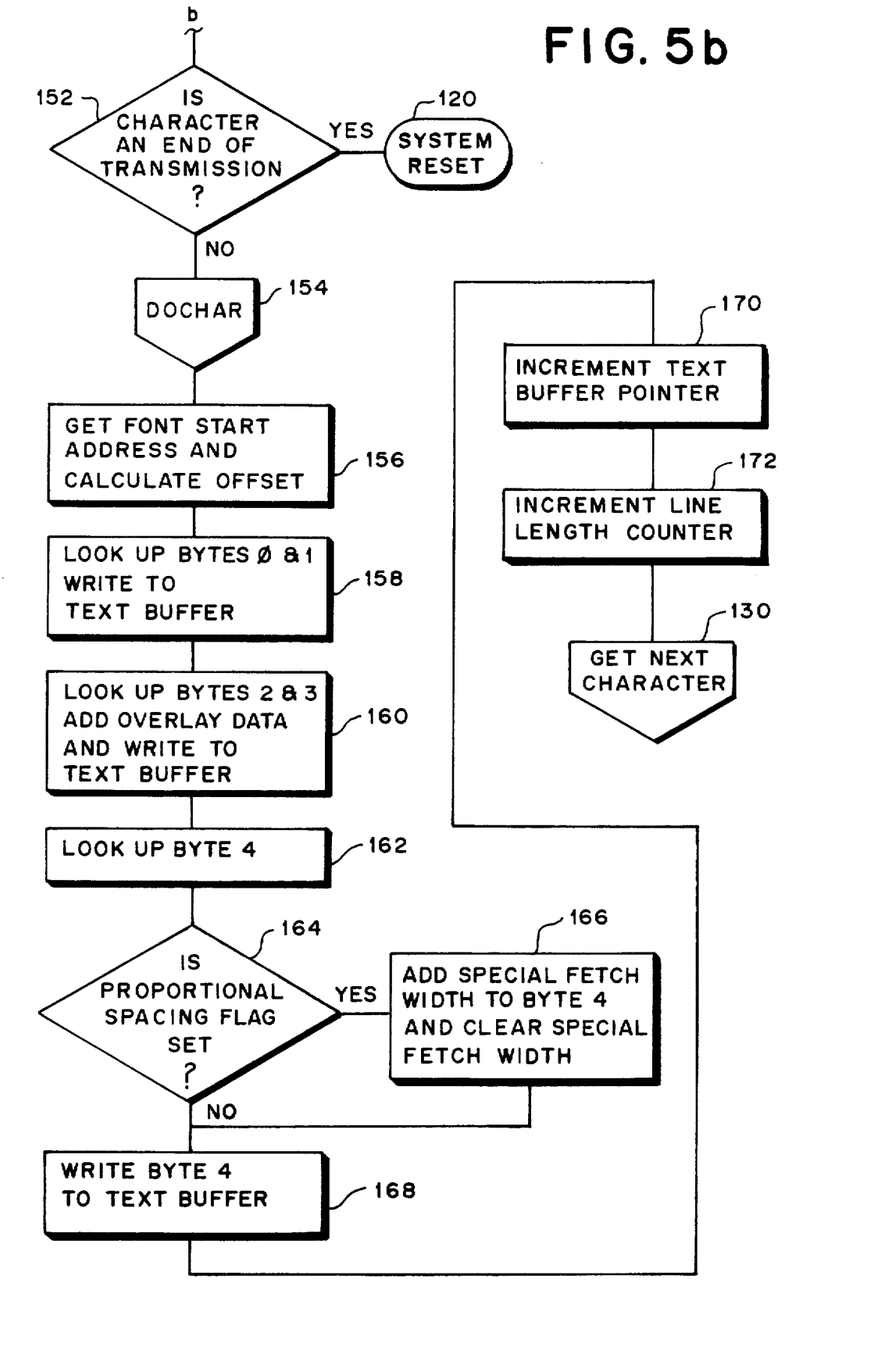
Figure 6:
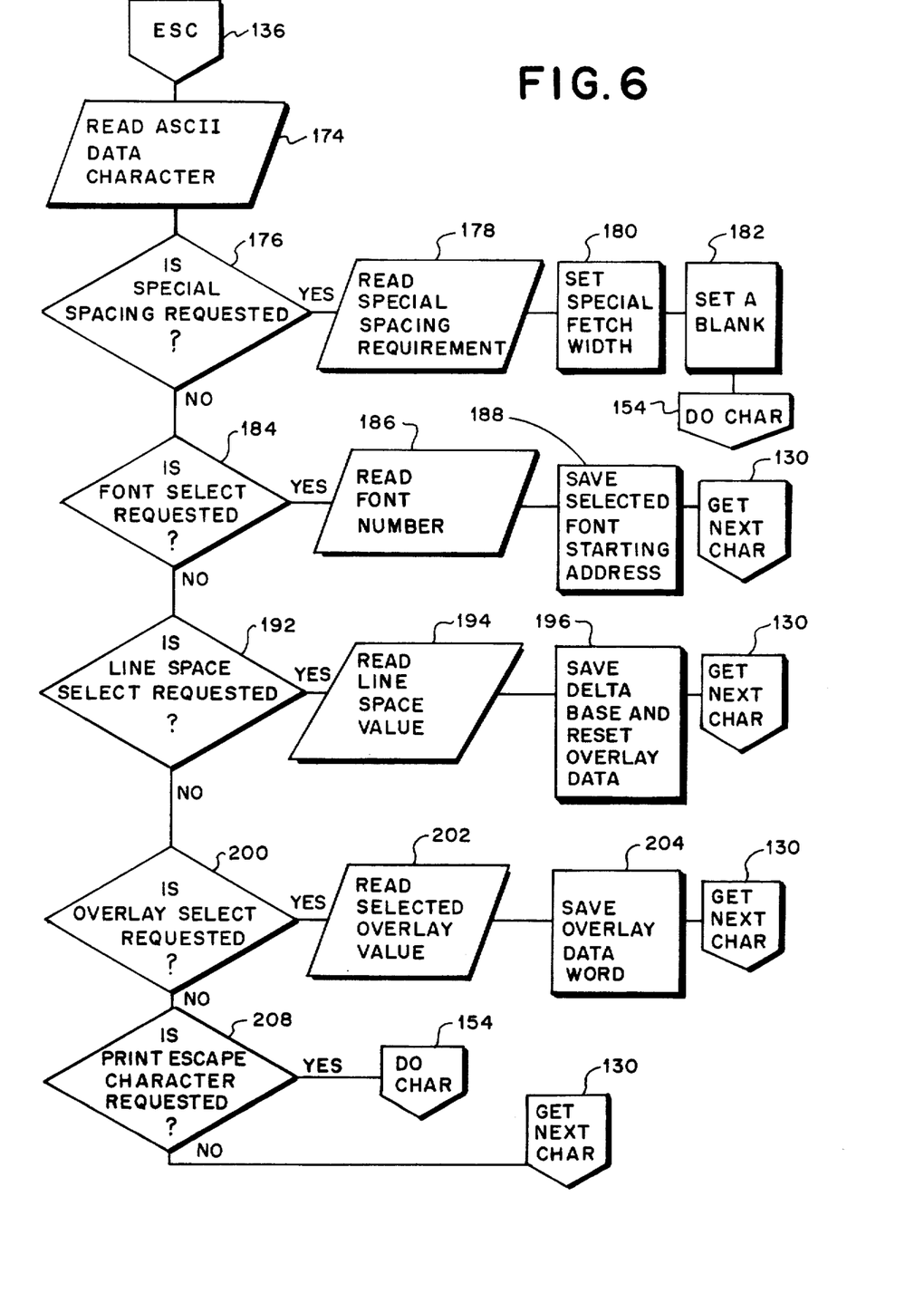
Figure 7:
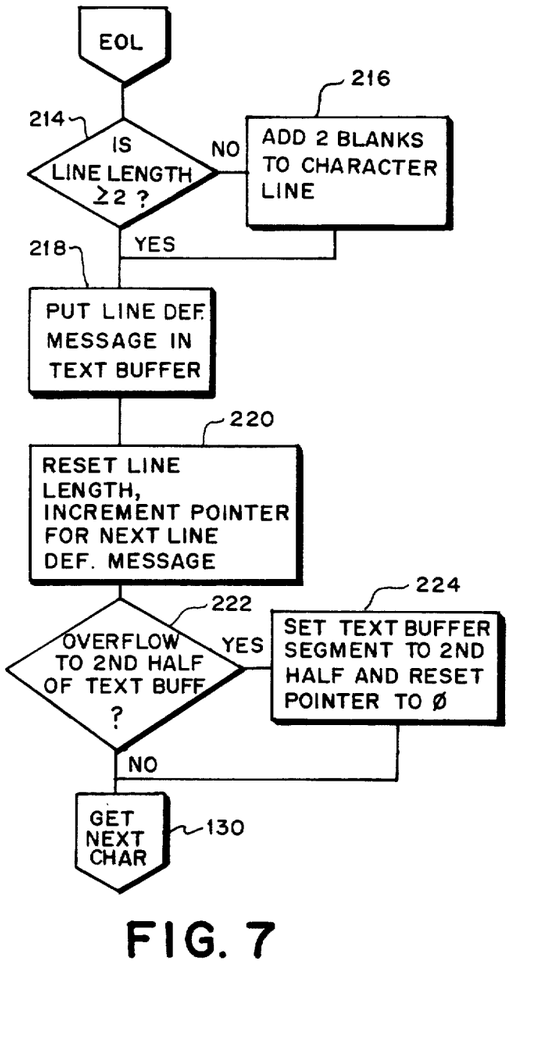

Referring now to FIGS. 5a, 5b, 6, 7 and 8, a flow chart is shown which describe steps taken to expand the incoming code and control the translation of user commands. Referring to FIGS. 5a and 5b, the system is first initilized 114 and default values such as font type, delta base and the like are loaded 116 into memory of the microprocessor 14. A determination is made whether the printer 35 is available 118 and if such printer is not available, then the system is reset 120. If the printer is available, the next character is read 122 from the ASCII data 12. This character defines the user escape flag. The flag is saved as an escape control command coming from the user in the ASCII data 12. The system is then reset for a new page 124, 128. At this point, the next character is read 132 from the incoming ASCII code 12. A determination is made if the data character is a special control command as defined previously 122. If such data is an escape flag, then a subroutine 136 is processed which subroutine is shown in FIG. 6 and will be described thereinafter. The next inquiry is whether the data character is a carriage return which represents end of line 138. If this is the end of a line, then a subroutine end of line (EOL) 140 is performed which is shown in FIG. 7 and will be described hereinafter. If it is not the end of a line, an inquiry is made if the data character is a form feed that denotes the end of a page 142. If it is the end of a page 142, then a subroutine 144 shown in FIG. 7 is performed, which will be described hereinafter. Thereafter, three further inquiries are made for data characters to be ignored: line feed 146, null 148 or rubout 150. If the answer to these is yes, then the routine is transferred to read the next data character 130. If the answer is no, then the routine continues and an inquiry is made whether the character is the end of transmission 152. If the answer is yes, then there is a reset 120, but if the answer is no, then the data character is to be expanded from an M bit code to an N bit code and placed in the text buffer RAM 16 by the DOCHAR 154 routine. This is followed by getting the font starting address and calculating the data character offset 156 in the look-up table 15 followed by looking up bytes zero and one 158 and writing the bytes into the text buffer RAM 16. This is then followed by a look-up of bytes two and three, adding the overlay data and writing to the text buffer RAM 160. This is then followed by looking up byte 4 162. After looking up word 2, the question is asked whether the proportional spacing flag has been set 164. If there is to be proportional spacing, a special fetch width is added to byte 4 166 and the proportional spacing flag is cleared. Following this, or if there is space justification, byte 4 is written into the text buffer RAM 168. Following this, the text buffer pointer is incremented 170 and then the line length counter is incremented 172. Following this, the next ASCII data character is read 130.

Referring now to FIG. 6, the escape subroutine 136 will now be described. When an escape flag 134 is found, the next ASCII data character is read 174. After this, a proportional spacing inquiry is made 176. If proportional spacing is called for, the space width is obtained 178 and the special fetch width is set 180. After this is completed, a blank character is forced 182 and the DOCHAR routine is performed 154. If there is no proportional spacing 176, an inquiry is made whether this is a font selection 184. If so, then the font to be selected is read 186 and the selected font starting address is saved 188. After this is completed, the get next character routine is performed 130. If the font selection inquiry 184 is negative, then a determination is made whether there is a line space selection 192. If there is, the line space value is read 194, the delta base is saved and overlay data is reset 196. After this is completed, then the next ASCII data character is processed 130. If the line space selection inquiry 192 is negative, then an overlay select determination is made 200. If this is positive, the overlay value is read 202 and the overlay data is saved 204. After this process, the get next character routine 130 is processed. If the overlay select 200 is negative, a determination is made if the escape character is to be printed. If so, then the DOCHAR routine is processed 154. If not, then the get next character routing is processed 130.

Referring now to FIG. 7, the end of line subroutine 140 is described. An inquiry is made as to whether the line length is greater than or equal to two 214. If not, then two blanks are added to the character line 216. If the response to the line length inquiry is positive, and after the add two blanks if applicable, a line definition message is put into the text buffer 218. Following this, the line length is reset and the pointer for the next line definition message is incremented 220. Following this, an inquiry is made as to whether there is an overflow to the second half of the text buffer RAM 222. If this response is yes, then the text buffer RAM segment register is set to the second half and the pointer is reset to zero. After this, or if the inquiry as to overflow is no, the routine proceeds to get the next character 130.

Figure 8:
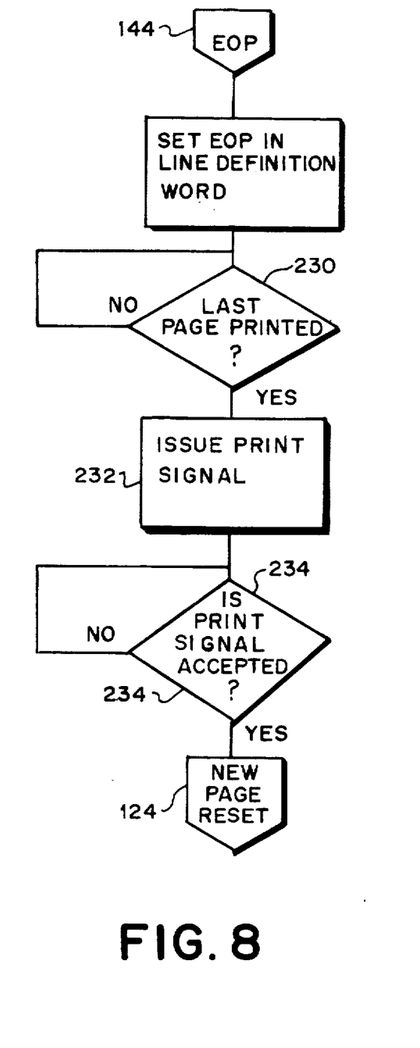

Referring now to FIG. 8, the end of page routine 144 is described. The end of page message is put into the line definition word in the text buffer 228. Following this, an inquiry is made as to whether the last page has been printed 230. If not, the inquiry is repeated. If so, then a signal is issued to print 232. Following this, an inquiry is made as to whether the print signal has been accepted 234. If not, then it is repeated, if yes, then the system is reset for a new page 124.

In conclusion, what has been described is a character generator 10 that allows a dot matrix printer 35 to be operated in response to an incoming code 12. This code is converted by the computer 14 into an expanded code which contains many pieces of information that are resident in the character generator 10 and is used to generate a dot pattern. From that conversion, the next conversion is to dot data which is printed by the dot matrix printer 35.

What is claimed is:

1. A character generator system for supplying text information to a dot matrix printer whereby text including characters may be printed on a record member, comprising:
   a data input for receiving information in the form of an M bit code representative of the text to be printed;
   a microprocessor connected to said input for receiving therefrom the information in the form of the M bit code and including means for expanding the M bit code to an N bit code where N is greater than M;
   a text buffer connected to said microprocessor for receiving and storing the expanded text information and outputting character start addresses;
   an address adder in connection with said text buffer for receiving character start addresses;
   a first address counter connected to the said address adder;
   a multiplier connected to said address adder;
   a row, width and character counter connected to said multiplier and to said text buffer for receiving dot row addresses, character width and character height information;
   a second address counter connected intermediate said microprocessor and said row, width and character counter for synchronizing the output of said text buffer with the output of said multiplier;
   a plurality of font PROMs connected to said first address counter to receive pixel addresses and generate pixel information; and a control logic in connection with said row, width and character counter and said second address counter for synchronizing activities thereof whereby;
   said multiplier receives counts from said row, width and character counter and generates character address offsets, said address adder receives and adds the offsets from said multiplier and character start addresses from said text buffer to generate dot row addresses and said first address counter receives the dot row addresses from said address adder to generate pixel addresses that are received by said font proms in response to which said font proms generate pixel information.

2. A character generator system for controlling the operation of a dot matrix printer whereby text of characters may be printed on a record member, comprising:
   a data input for receiving information representative of the characters to be printed;
   a microprocessor connected to said data input;
   a text buffer in connection with said microprocessor for storing and sequentially outputting said information;
   an address adder in connection with said text buffer for receiving a first portion of said information;
   an address counter connected to the said address adder;
   a plurality of font PROMs containing character dot configuration connected to said address counter;
   character offset means connected to said text buffer for receiving a second portion of said information; and
   control logic means in connection with said character offset means and said address counter for synchronizing the activities therebetween; whereby
   said text buffer receives information relative to text to be printed from said microprocessor and sends information relative to dot row address, character height and width to said row, width and character counter and sends character start addresses to said address adder for the location in said font PROMs of pixel information representative of characters called for in the data input;
   said address adder in response to said text buffer and said character offset means determines dot row addresses of the called for characters and transmits such dot row addresses to said address counter;
   said address counter receives the character dot row address and determines the pixel addresses under control of said control logic means; and
   said font PROMs receive said pixel addresses and generate pixel information to be sent to the printer representative of dot location to be printed by the printer.

3. A character generator system for a dot matrix printer capable of printing text with characters of selectable characteristics, comprising:

input means for receiving data representative of text information;

data processing means connected with said input means to receive and store data therefrom;

means for receiving said data from said data processing means and determining an address;

counter means for receiving the address and determining dots to be printed; and a plurality of font PROMs for receiving the dot determination from said determining means and assigning dot size values thereto.

4. The character generating means of claim 3 including a multiplier connected to said font PROMs for receiving parallel information from said font PROMs and multiplexing said information for supplying a printer with serial information.

5. Character generator system for supplying text information to a dot matrix printer, comprising:

means for receiving data that includes line definition words and character definition words;

means for storing said data;

means for sequentially outputting from said storing means a first portion of said data representative of character address data;

means for receiving a second portion of said data representative of the length and width of a line to be printed and the height and width of characters to be printed;

means connected to said receiving means for generating address offsets;

counter means connected to said outputing means and said offset address means for generating dot row addresses;

means for receiving said dot row addresses and said offset addresses and generating pixel addresses;

means for receiving said dot pixel addresses and generating pixel information signals representative of dots to be printed; and means for connecting said pixel information means to a dot matrix printer.

6. In a method of operating a character generator system for supplying text information to a dot matrix printer, comprising:

supplying digital data to the character generator;

expanding the data from an M bit code to an N bit code, where N is greater than M;

placing the expanded data in memory;

sequentially outputting a first portion of the expanded data in the form of stored address data;

receiving the balance of the expanded data to determine completion of the length and width of a line to be printed and the height and width of characters to be printed;

calculating address offsets from the balance of the expanded data;

receiving the address data and address offsets and calculating dot row addresses;

receiving dot row addresses and address offsets and generating pixel addresses;

receiving the pixel addresses and generating pixel information signals representative of dots to be printed; and supplying the pixel information to a dot matrix printer.

7. The method of claim 6 including the step of selecting dot sizes of the dots to be printed.

8. A character generator system for supplying information relative to text information to a dot matrix printer whereby characters may be printed on a record member, comprising:

means for receiving the text information in the form of an M bit code;

means for expanding the M bit code to an N bit code, where N is greater than M, whereby N bit words may be generated;

buffer means;

means for placing the N bit words in said buffer means until the entire received text information is stored in said buffer means;

means for generating addresses that point to the N bit words in said buffer means;

row, width and character counter means;

means for selectively loading a portion of said N bit words into said row, width and character counter means;

address adder means;

means for supplying character start addresses from the balance of said N bit words into said address adder means;

means for multiplying the output of said row, width and character counter to generate an offset to be applied to said address adder means for determining dot row addresses;

address counter means for receiving said dot row addresses and generating pixel addresses;

font PROM means; and means for sending said pixel addresses to said font PROM means whereby dot location may be determined.

* * * * *